United States Patent
Lee

(10) Patent No.: US 8,874,335 B2
(45) Date of Patent: Oct. 28, 2014

(54) CONTROL DEVICE OF FUEL CELL VEHICLE WITH MULTI-DRIVE SYSTEM AND CONTROL METHOD THEREOF

(75) Inventor: Jinhun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 863 days.

(21) Appl. No.: 12/949,042

(22) Filed: Nov. 18, 2010

(65) Prior Publication Data

US 2011/0137501 A1 Jun. 9, 2011

(30) Foreign Application Priority Data

Dec. 3, 2009 (KR) ........................ 10-2009-0119385

(51) Int. Cl.
- *B60L 11/00* (2006.01)
- *B60L 11/18* (2006.01)
- *B60L 3/00* (2006.01)

(52) U.S. Cl.
CPC ......... *B60L 11/1894* (2013.01); *B60L 11/1881* (2013.01); *Y02T 10/7258* (2013.01); *Y02T 10/7022* (2013.01); *B60L 11/005* (2013.01); *B60L 3/0092* (2013.01); *Y02T 90/34* (2013.01)
USPC .............................................. 701/58; 701/22

(58) Field of Classification Search
CPC ... B60L 3/0092; B60L 1/005; B60L 11/1881; B60L 11/18941; Y02T 90/34; Y02T 10/7022; Y02T 10/7258
USPC ....... 340/438, 453; 475/5; 477/3; 701/22, 51, 701/54, 55, 56, 58
See application file for complete search history.

(56) References Cited

U.S. PATENT DOCUMENTS

| | | | | |
|---|---|---|---|---|
| 5,952,587 | A * | 9/1999 | Rhodes et al. | 73/862.541 |
| 6,040,768 | A * | 3/2000 | Drexl | 340/453 |
| 6,225,892 | B1 * | 5/2001 | Chene | 340/438 |
| 6,480,774 | B1 * | 11/2002 | Snow et al. | 701/51 |
| 2003/0119620 | A1 | 6/2003 | Zwilling et al. | 475/219 |
| 2004/0061603 | A1 * | 4/2004 | Mack | 340/453 |
| 2005/0247503 | A1 * | 11/2005 | Imazu | 180/300 |
| 2006/0191168 | A1 * | 8/2006 | Casey et al. | 37/348 |
| 2009/0223726 | A1 * | 9/2009 | Jeon et al. | 180/65.25 |

* cited by examiner

*Primary Examiner* — Stephen Holwerda
(74) *Attorney, Agent, or Firm* — Edwards Wildman Palmer LLP; Peter F. Corless

(57) ABSTRACT

A control apparatus and a control method of a fuel cell vehicle is provided, in which a fatigue value of a plurality of driving portions is determined and respective torques are distributed according to the fatigue value thereof such that the durability thereof is stably improved, thereby improving overall operating performance.

5 Claims, 6 Drawing Sheets

CONTROL DEVICE OF FUEL CELL VEHICLE WITH MULTI-DRIVE SYSTEM AND CONTROL METHOD THEREOF

CROSS-REFERENCE TO RELATED APPLICATION

This application claims priority to and the benefit of Korean Patent Application No. 10-2009-0119385 filed on Dec. 3, 2009, the entire contents of which are incorporated herein by reference.

BACKGROUND OF THE INVENTION (a) Field of the Invention

The present invention relates to a control apparatus of a fuel cell vehicle and a control method thereof. More particularly, the present invention relates to a control apparatus of a fuel cell vehicle having a plurality of driving systems and a control method thereof.

(b) Description of the Related Art

A fuel cell is an electric generator system for transforming chemical energy to electrical energy, wherein unit cells having a pair of an anode and a cathode between electrolytes are arranged in series.

A balance of plant (BOP) is used to supply the anode of the unit cell with hydrogen and to supply the cathode with oxygen such that electricity and heat are generated through chemical reaction of an ionized material.

FIG. 6 shows a power net of a conventional fuel cell vehicle, which includes a fuel cell stack 100, a super capacitor 120, an inverter 130, a motor 140, a reduction gear unit (RGU) 150, and a gear differential unit (GDU) 160.

The fuel cell stack 100 as a main power source generates electricity through a chemical reaction of hydrogen supplied to the anode with oxygen supplied to the cathode of the unit cell through the BOP.

The super capacitor 120 is an assistant power source that can be quickly charged and discharged, is connected to a power line 102 in parallel to assist output power of the fuel cell stack 100, and charges regenerative braking energy to improve efficiency of the fuel cell.

The inverter 130 includes an insulated gate bipolar transistor (IGBT) as a semiconductor element, and transforms DC high voltage outputted from the fuel cell stack 100 and the super capacitor 120 through high speed switching so as to operate the motor 140.

Output torque of the motor 140 is increased by the RGU 150 as a first reduction gear, and is increased by the GDU 160 as a second reduction gear to be transferred to a wheel.

In the conventional fuel cell vehicle, one fuel cell and one motor are used. Accordingly, the top speed of the vehicle is relatively low and driving performance is not excellent on an uphill road.

A multi-driving system has been introduced to offer high torque, in which a plurality of motors are connected in parallel, and inverters for operating each motor are disposed therein.

As shown in FIG. 5, the multi-driving system generally includes three motors, and a power coupling device (PCD) that is engaged with gears connected to rotation shafts of the motors to transfer driving torque with one shaft.

However, in the multi-driving system, different torques are applied to each input shaft A of the PCU operated by each motor such that durability of reduction gears is deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a control apparatus of a fuel cell vehicle having a plurality of driving systems having advantages of accumulating operation time and torque amount of each motor connected to a power coupling device (PCD), determining a fatigue value of a gear portion connected to each motor and the PCD, and appropriately distributing the operation time and the torque to each motor according to the fatigue value such that the durability of the gear system is improved.

A control apparatus of a fuel cell vehicle having a plurality of driving systems may include a vehicle controller applying a signal of an accelerator pedal sensor and a motor speed to a control map to calculate a torque demand amount, a fuel cell controller outputting a total available power according to a driving condition and a driving mode, an output controller determining a total torque amount based on the torque demand amount and the total available power, and determining respective fatigue values of gear portions according to operation time and torque amount of the gear portions, and a motor controller distributing the total torque amount to each motor according to a control signal of the output controller.

The demand torque amount may be calculated by a total demand torque amount determined by the vehicle control device regardless of the operation of the motor forming a multi-driving system.

The fuel cell controller may perform a mild mode operating some fuel cells, and a power mode operating all fuel cells by applying driving conditions such as temperature, gas pressure, gas flow amount, and humidity.

The output controller may apply a minimum torque to a motor engaged with a gear portion having a maximum fatigue value, and applies a maximum torque to a motor engaged with a gear portion having a minimum fatigue value.

The output controller may determine a fatigue value by considering a torque signal transferred to each motor*a torque weight value*a rotation speed*a rotation speed weight value*an operation time.

A control method of a fuel cell vehicle may include controlling a motor and an inverter such that efficiency thereof is maximized if a torque is demanded by a driver, determining a fatigue value of each gear portion engaged with each motor according to an operation time and a torque amount of each motor, and distributing a torque to the motors according to the fatigue values of the respective gear portions.

As stated in the present invention, operation time and torque are distributed to each motor according to the respective fatigue values of the respective gear portions to which a plurality of motors that are operated in an optimized point and reduction gears are connected such that a load being applied to the gear portion is equally decentralized, a fatigue value of the reduction gear is reduced, and the durability thereof is improved in a fuel cell vehicle having a multi-driving system.

DETAILED DESCRIPTION OF THE EMBODIMENTS

Figure 1:
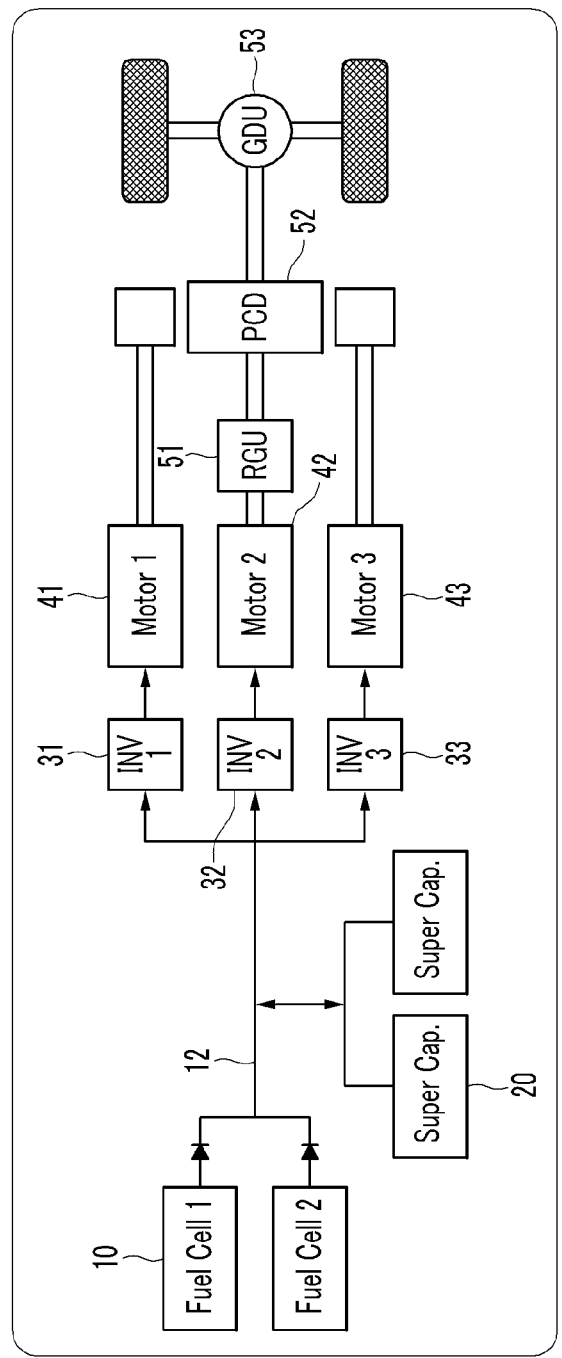
FIG. 1 shows a power net of a fuel cell vehicle having a multi-driving system according to an exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

FIG. 1 shows a power net of a fuel cell vehicle having a multi-driving system according to an exemplary embodiment of the present invention.

The power net includes a fuel cell stack 10 as a main power source, a super capacitor 20 as an assistant power source that can quickly discharge a high power, a plurality of inverters 31-33, a plurality of motors 41-43, a reduction gear unit (RGU) 51, a power coupling device (PCD) 52, and a gear differential unit (GDU) 53.

The fuel cell stack 10 can be several units depending on a capacity thereof to generate electricity through chemical reaction of hydrogen supplied to an anode with oxygen supplied to a cathode of a unit cell depending on an operation of a balance of plant (BOP).

The super capacitors 20 are connected to the power line 12 in parallel to assist an output of the fuel cell stack 10, and to improve efficiency of the fuel cell by charging regenerative braking energy.

The plurality of inverters 31-33 are provided to be connected to the power line 12, and transform a DC high voltage outputted from the fuel cell stack 10 and the super capacitors 20 through high speed switching to operate the motors 41-43.

Operating torque and operation time of the motors 41-43 are adjusted according to control of the inverters 31-33 corresponding to the motors 41-43, the motors 41-43 are driven by the inverters such that total efficiency is maximized, and the output torques of the motors 41-43 are transformed to one output by the PCD 52 to be transferred to a wheel through the GDU 53.

Figure 2:
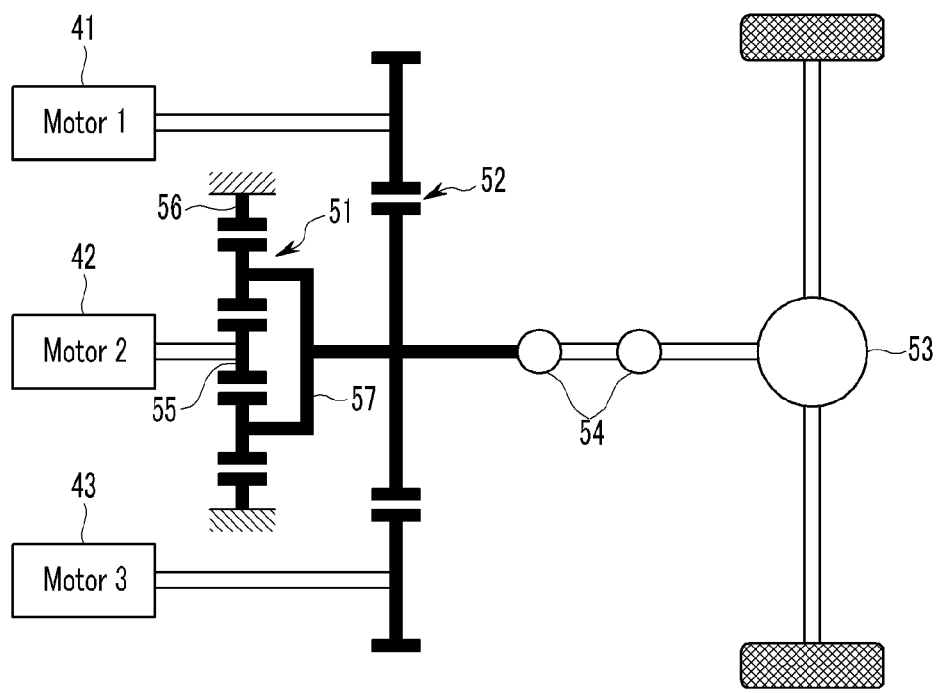
FIG. 2 shows a power connection structure of a multi-driving system in a fuel cell vehicle according to an exemplary embodiment of the present invention.

FIG. 2 shows a power connection structure of a multi-driving system in a fuel cell vehicle according to an exemplary embodiment of the present invention.

As shown in FIG. 2, the present invention includes the first to third motors 41-43 arranged in parallel to share one power line 12, and a PCD 52 directly connected to an output shaft of the first and third motors 41 and 43 and connected to an output shaft of the second motor 42 through the RGU 51.

The torques of the first motor 41 and the third motor 43 are equally increased through a gear ratio of the PCD 52, and the torque of the second motor 42 is increased equal to that of the first motor 41 and the third motor 43 through the RGU 51.

The RGU 51 is used to maximize the torque of the second motor 42, and can be composed of a planetary gear set with the PCD 52.

As shown in FIG. 2, the output shaft of the second motor 42 is connected to a sun gear 55 of the RGU 51, a ring gear 56 is fixed, a carrier 57 is engaged with the PCD 52, and the torque of the second motor 42 is increased through the carrier 57.

In this case, the first to third motors 41-43 have equal torque increment ratios.

The final output through the PCD 52 is transferred to the GDU 53 through a universal joint 54.

The reason why the second motor 42 is connected to the PCD 52 through the RGU 51 is that operating torque cannot be maximized without the RGU 51, and the vehicle speed is limited by the second motor 42.

Accordingly, the RGU 51 equally increases a gear ratio of the first to third motor 41-43 to maximize driving torque of the vehicle.

A top speed or uphill performance can be secured by combining the RGU 51, the PCD 52, and the GDU 53.

Figure 3:
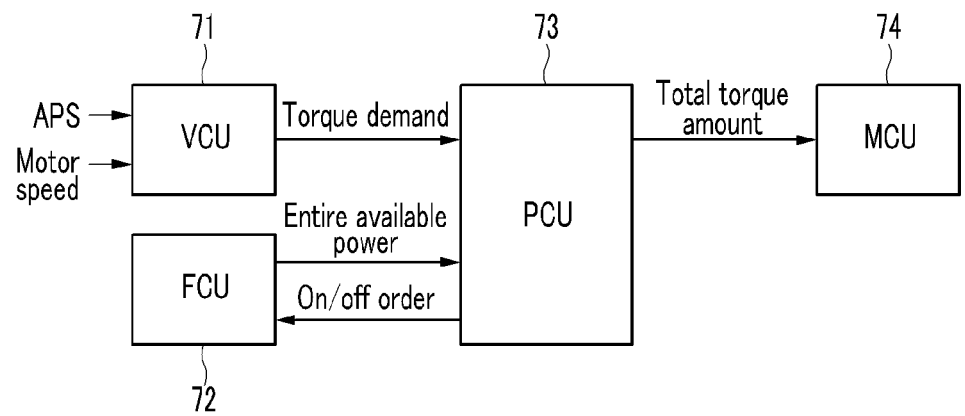
FIG. 3 shows a schematic diagram of a control apparatus of a fuel cell vehicle according to an exemplary embodiment of the present invention.

FIG. 3 shows a schematic diagram of a control apparatus of a fuel cell vehicle according to an exemplary embodiment of the present invention.

The control apparatus includes a vehicle control unit (VCU) 71, a fuel cell control unit (FCU) 72, a power control unit (PCU) 73, and a motor control unit (MCU) 74.

The VCU 71 as a vehicle controller detects a signal of an accelerator pedal sensor (APS) as a driver's acceleration demand, and a motor speed, applies them to a predetermined map, and calculates a torque demand amount to output it the PCU 73.

In this case, the torque demand amount is calculated by considering outputs of all three motors regardless of the present use thereof in a multi-driving system in which three motors 41-43 are used.

The FCU 72 as a fuel cell controller outputs all available power of the fuel cell to transfer it to the PCU 73 according to a driving mode and a driving condition.

The driving mode can be divided into a mild mode in which some of the fuel cells are operated and a power mode in which all of the fuel cells are operated.

Further, the driving condition can include a temperature, a pressure, a flux, and humidity.

The PCU 73 as an output controller calculates a total torque amount based on a torque demand amount according to a driver's desire and entire available power of the fuel cell, finds a driving point at which each motor is most efficiently operated, and outputs the total torque signal to the MCU 74.

The MCU 74 as a motor controller includes an inverter, and distributes the total torque amount to each motor according to a control signal transferred from the PCU 73.

For example, in a case that a torque demand is 120 kW and a total torque amount in a motor speed is 300 Nm, the first to third motors 41-43 are controlled to respectively generate 40 kW, and the output torque of 100 Nm is equally distributed to each of the motors 41-43 such that the efficiency becomes 80%.

However, if the first motor 41 and the third motor 43 are controlled to output 60 kW, the respective output torque thereof is 150 Nm, and the second motor 42 is controlled to sustain an idle condition, the efficiency becomes 90% such that the fuel consumption is reduced.

As stated above, if the output torque is independently controlled by considering efficiency, freedom for selecting motors coupled in parallel is enhanced and energy efficiency is improved.

As described above, a different torque amount is generated by the first to third motors 41-43 according to a total torque amount demanded by the PCU 73 such that torque amounts applied to each of the gear portion of the PCD 52 are different.

Accordingly, the PCU 73 detects operation time and torque amount and cumulates them so as to determine a fatigue value of the gear portion. In addition, a total torque amount determined by a torque demand amount from a driver's desire and entire available power of the fuel cell is adequately distributed to each motor according to the fatigue value.

In other words, a minimum torque is generated from a motor engaged with a gear portion in which a fatigue value thereof is highest, and a maximum torque is generated from a motor engaged with a gear portion in which a fatigue value thereof is lowest.

The fatigue value of the gear portion is determined by the product of a torque demand transferred to each motor, a torque weight value, a rotation speed, a rotation speed weight value, and an operation time.

Figure 4:
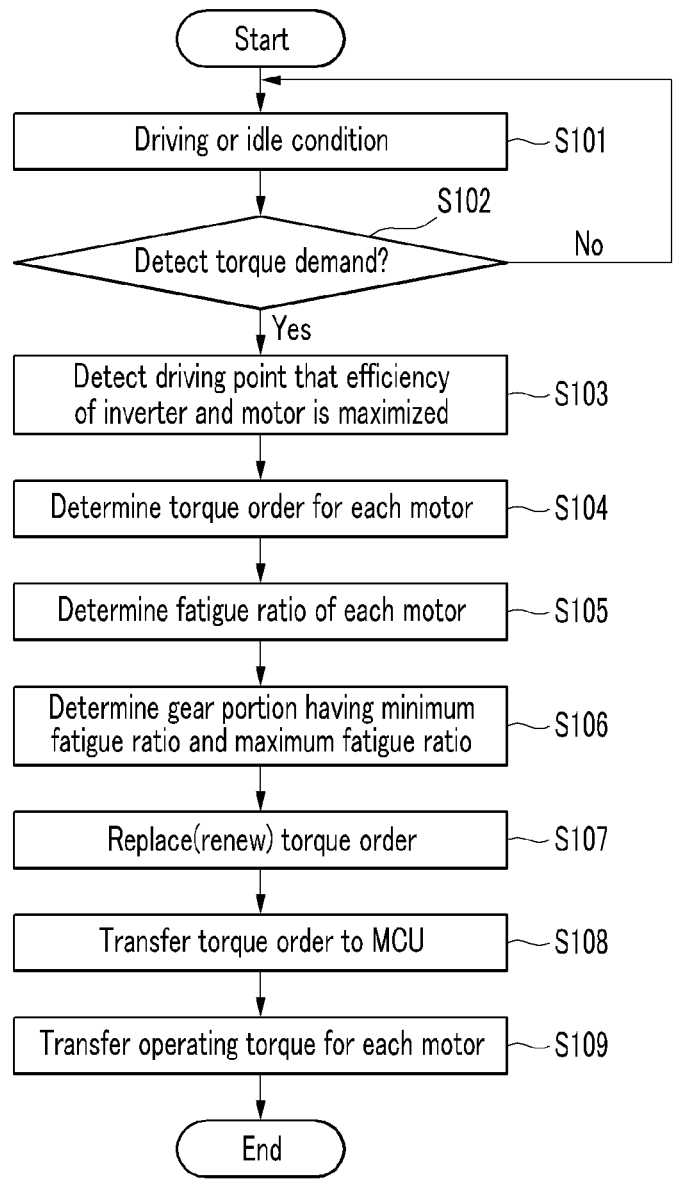
FIG. 4 is a flowchart showing a control flow of a fuel cell vehicle according to an exemplary embodiment of the present invention.
Figure 5:
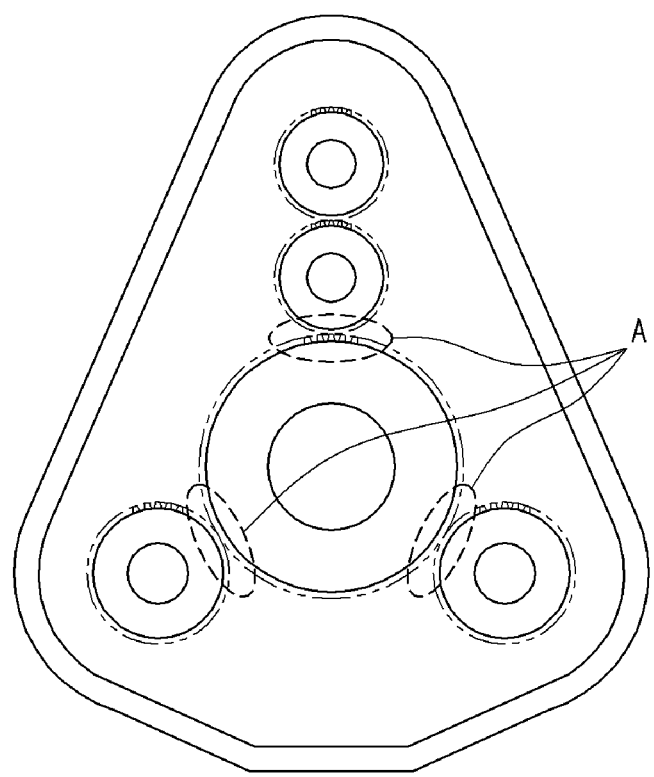
FIG. 5 is a perspective view showing a gear connection of a conventional multi-driving system.
Figure 6:
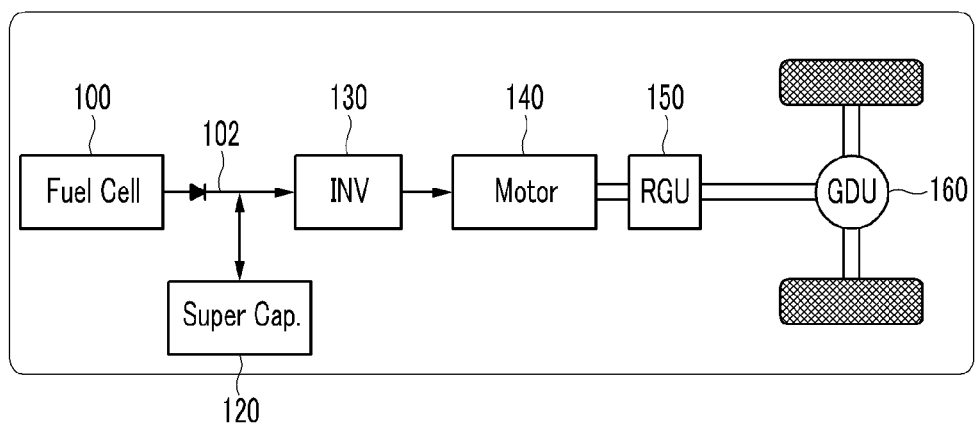
FIG. 6 shows a power net of a conventional fuel cell vehicle.

FIG. 4 is a flowchart showing a control flow of a fuel cell vehicle according to an exemplary embodiment of the present invention.

In a driving or idling condition (S101) of the fuel cell vehicle having a multi-driving system according to the present invention, the VCU 71 determines whether a torque demand is detected from a signal of an accelerator pedal sensor (APS) as a driver's desire (S102).

If the torque demand is demanded according to a driver's desire in S102, a motor speed is detected, the motor speed and the accelerator pedal sensor signal are applied to a predetermined control map to determine the torque demand amount, and the torque demand amount is transferred to the PCU 73.

In this case, powers of all three motors are considered to determine the torque demand amount in a multi-driving system having three motors 41-43 regardless of the present use condition.

The PCU 73 determines a total torque amount based on a torque demand amount calculated from a driver's pedal and entire available power, and calculates an operating portion in which the efficiency of the inverter and the motor is highest (S103).

Further, a torque order of the first to the third motor 41-43 is determined (S104).

Subsequently, the PCU 73 calculates a fatigue value of each gear portion from the accumulated operation time and torque amount of the first to third motors 41 (S105).

The fatigue value of each gear portion is determined by the product of a torque order transferred to each motor, a torque weight value, a rotation speed, a speed weight value, and an operation time.

In determination of the fatigue value of each gear portion in S105, a gear portion having a maximum fatigue value and a gear portion having a minimum fatigue value are determined (S106), a torque order is renewed (S107), and a control signal for controlling the first to third motors 41-43 is transferred to the MCU 74 (S108).

In other words, a minimum torque is generated from a motor engaged with a gear portion in which a fatigue value thereof is highest, and a maximum torque is generated from a motor engaged with a gear portion in which a fatigue value thereof is lowest.

Accordingly, the MCU 74 individually controls the first to third motors 41-43 to stably sustain the durability of the PCD (S109).

The total torque is distributed to each of the gear portions according to the fatigue value.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An operating system for a fuel cell vehicle having a plurality of driving systems, comprising:
   a vehicle controller applying a signal of an accelerator pedal sensor and a motor speed to a control map to calculate a torque demand amount;
   a fuel cell controller outputting a total available power according to a driving condition and a driving mode and performing a mild mode operating some fuel cells, and a power mode operating all fuel cells by applying driving conditions selected from a group consisting of temperature, gas pressure, gas flow amount, and humidity;
   an output controller determining a total torque amount based on the torque demand amount and the total available power, and determining respective fatigue values of respective gear portions according to operation time and torque amount of the gear portions; and
   a motor controller distributing the total torque amount to each motor of a plurality of motors according to a control signal of the output controller;
   wherein the output controller applies a minimum torque to each motor engaged with a gear portion having a maximum fatigue value, and applies a maximum torque to a motor engaged with a gear portion having a minimum fatigue value.

2. The operating system of a fuel cell vehicle of claim 1, wherein the torque demand amount is calculated by a total demand torque amount determined by the vehicle controller regardless of the operation of each motor forming a multi-driving system.

3. The operating system of a fuel cell vehicle of claim 1, wherein the output controller determines fatigue values by the product of a torque signal transferred to each motor, a torque weight value, a rotation speed, a rotation speed weight value, and an operation time.

4. A control method of an operating system of fuel cell vehicle, comprising:
   controlling a motor and an inverter such that efficiency of the motor and the inverter is maximized, if a torque is demanded by a driver;
   determining a fatigue value of each gear portion engaged with each motor according to an operation time and a torque amount of each motor;
   distributing a torque to the motors according to the fatigue values of the respective gear portions; and
   performing a mild mode operating some fuel cells, and a power mode operating all fuel cells by applying driving conditions selected from a group consisting of temperature, gas pressure, gas flow amount, and humidity,
   applying a minimum torque to each motor engaged with a gear portion having a maximum fatigue value; and
   applying a maximum torque to a motor engaged with a gear portion having a minimum fatigue value.

5. The control method of an operating system of claim 4, wherein the fatigue value of the gear portion is determined by the product of a torque signal transferred to each motor, a torque weight value, a rotation speed, a speed weight value, and an operation time.

* * * * *